Figure 1:
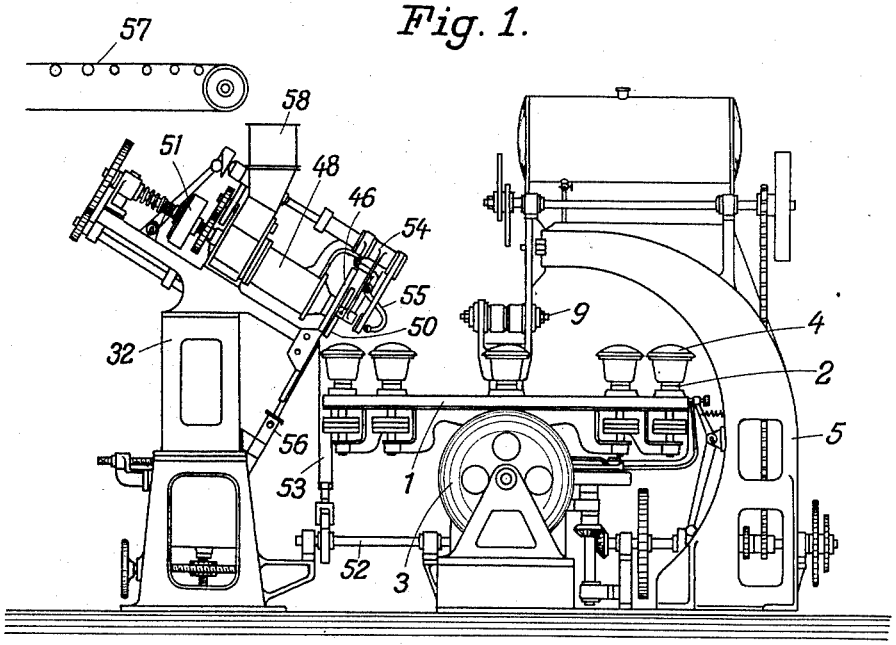
Figure 2:
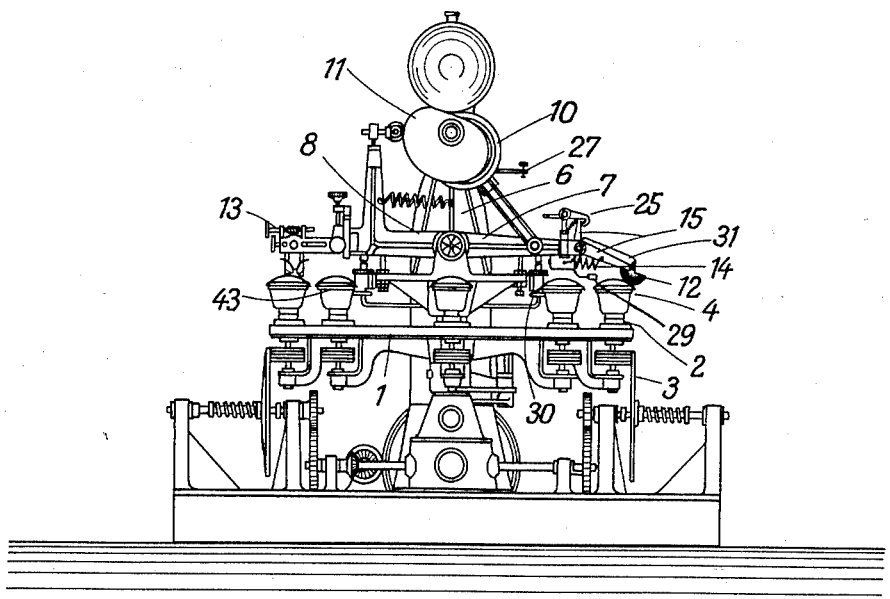

June 10, 1930.  J. DENGLER  1,762,387
MACHINE AND PROCESS OF MANUFACTURE OF POTTERY OR CERAMIC ARTICLES
Filed Dec. 21, 1928  8 Sheets-Sheet 1

Inventor:
Josef Dengler
by Herbert J. Charles
Attorney

June 10, 1930. J. DENGLER 1,762,387
MACHINE AND PROCESS OF MANUFACTURE OF POTTERY OR CERAMIC ARTICLES
Filed Dec. 21, 1928    8 Sheets-Sheet 2

Inventor:
Josef Dengler
by Herbert J Bader
Attorney

June 10, 1930.    J. DENGLER    1,762,387
MACHINE AND PROCESS OF MANUFACTURE OF POTTERY OR CERAMIC ARTICLES
Filed Dec. 21, 1928    8 Sheets-Sheet 3

Inventor:
Josef Dengler
by *Attorney*

June 10, 1930.   J. DENGLER   1,762,387
MACHINE AND PROCESS OF MANUFACTURE OF POTTERY OR CERAMIC ARTICLES
Filed Dec. 21, 1928    8 Sheets-Sheet 4

Inventor:
Josef Dengler
by Herbert J. Barton
Attorney

June 10, 1930.   J. DENGLER   1,762,387

MACHINE AND PROCESS OF MANUFACTURE OF POTTERY OR CERAMIC ARTICLES

Filed Dec. 21, 1928   8 Sheets-Sheet 5

Inventor:
Josef Dengler
by (signature)
Attorney

June 10, 1930.　　　　J. DENGLER　　　　1,762,387
MACHINE AND PROCESS OF MANUFACTURE OF POTTERY OR CERAMIC ARTICLES
Filed Dec. 21, 1928　　　8 Sheets-Sheet 6

Inventor:
Josef Dengler
by [signature]
Attorney

June 10, 1930. J. DENGLER 1,762,387
MACHINE AND PROCESS OF MANUFACTURE OF POTTERY OR CERAMIC ARTICLES
Filed Dec. 21, 1928 8 Sheets-Sheet 7

Inventor:
Josef Dengler

June 10, 1930.  J. DENGLER  1,762,387
MACHINE AND PROCESS OF MANUFACTURE OF POTTERY OR CERAMIC ARTICLES
Filed Dec. 21, 1928  8 Sheets-Sheet 8

Inventor:
Josef Dengler
by
Attorney

Patented June 10, 1930

1,762,387

UNITED STATES PATENT OFFICE

JOSEF DENGLER, OF PODERSAM, CZECHOSLOVAKIA

MACHINE AND PROCESS OF MANUFACTURE OF POTTERY OR CERAMIC ARTICLES

Application filed December 21, 1928, Serial No. 327,657, and in France May 15, 1928.

It is known that in the pottery or ceramic industry, the manufacture of all kinds of pottery ware has been done for years for the greater part by hand labour, and all articles have been manufactured with the assistance of various moulding templates on so-called moulding spindles. These articles, generally manufactured by hand, require highly skilled workmen as the work is very difficult and takes a long time. The method heretofore adopted, for instance, in the manufacture of saucers, dinner plates, etc., consists in producing from plastic material, by means of a press template, a preliminary shaping on a potter's wheel and afterwards placing it on a working gypsum mould where the sheet of plastic material is centrally rounded off by means of a wire cutter. After this preliminary work, the mass of material is shaped by hand and, by means of a wet sponge applied over the working mould, is uniformly formed.

After this complicated working operation, begins the final forming of the article, which is done by the potter pressing it with a flat iron template and a wet sponge against the rotating working mould until the dinner plate or the like is completely shaped and made. This method of working requires the employment of skilled men, the output is very low, and the cost is very high.

The invention relates to a machine for automatically manufacturing pottery ware or ceramic articles and which automatically carries out all the work, entailed in the production of a finished article from the raw material, at a greatly enhanced speed compared with hand-work and at considerably lower cost.

A construction of the automatic machine according to the invention is illustrated in the drawings in which:—

Figures 1, 2, 3, 8 and 9 illustrate the complete machine, whilst

Figure 4:
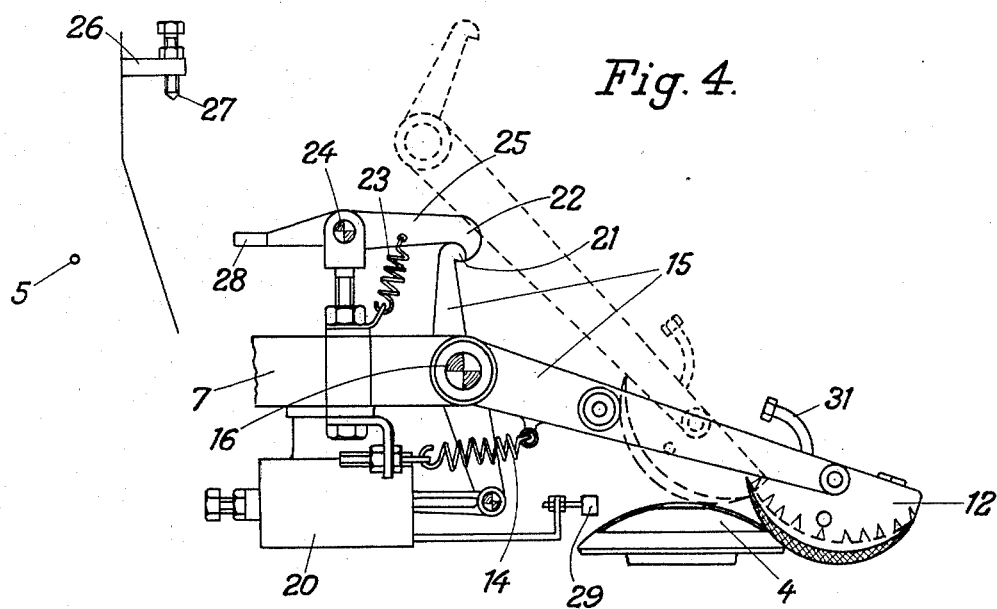
Figure 4A:
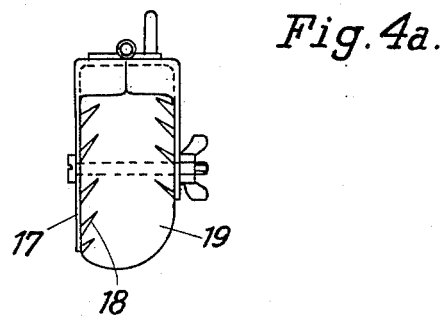

Figures 4, 4ª, 5, 5ª, 6, 6ª, 7, 7ª and 10 are detail views on an enlarged scale.

The machine comprises a rotatable round working table 1 which is intermittently operated in a suitable manner and provided with several rotating spindles 2 which, in the same way as the working table itself, are successively rotated at periodic time intervals by means of friction discs 3. The rotating spindles 2 carry, at the top, working moulds 4. Laterally of the working table, is mounted a main iron standard 5 which is connected to the centre of the working table 1 by means of a special bracket 6, in the centre of which are mounted rockable lever arms 7, 8. The lever arms 7 and 8 are rockable about a joint pin 9 above the working table 1 and are operated by eccentrics 10 or cam discs 11. At the end of the lever arm 7 is provided a wiping-off member 12, and at the end of the lever arm 8 a mould template 13.

The wiping-off member 12 (Figure 4) is constituted by a double armed lever 15 which is always pulled downwards by a tension spring 14 and is mounted rotatably about a pin 16 provided on the lever arm 7. To the end of the said lever 15 is mounted a wiping-off member 12 which is always pressed downwards in a springy manner. The wiping-off member 12 is constituted by a casing 17 in two parts which is provided inside with spikes 18 and holds fast a sponge 19. Under the lever arm 7 is mounted a pneumatic shock absorber 20 which absorbs the impact due to falling of the scraper or wiping-off member 12 or reduces the speed of fall. The upper hook shaped end 21 (Figure 4) of the lever 15 is arranged to engage with the outer hook shaped end 22 of a pivoted double armed pawl 25 controlled by the action of a spring 23, the pawl turning about the pin 24.

On the outer main standard 5 is mounted, on a radial arm 26, an adjustable stop pin or tappet 27 in such a manner that the inner end 28 of the double armed pawl 25 strikes it during the rocking of the lever 7 in the upward direction. Further, laterally of a mould 4 which may be beneath the lever 15 is a wire cutter 29 (Figure 2) as well as a force pump 30 which supplies the necessary water to the wiping-off member 12 through a pipe 31 (Figure 4) and moistens the sponge 19.

The plastic substance, is produced by a press 32, mounted laterally of the working table 1, and drops down onto the working mould 4, on which it is cut to round shape by the wire cutter 29 and uniformly pressed against the working mould 4 and smoothed out by the scraper or wiper-off member 12. Owing to the rocking movement of the lever 7, the wiping-off member 12 moves alternately from the lowest position shown in Figure 4, to the highest position shown in Figure 4, and back again. In the lowest position of the wiping-off member 12, the lever end 21 engages with the double armed pawl 25, but is brought out of engagement again in the uppermost position owing to the pawl end 28 striking against the stop pin 27.

Figure 5:
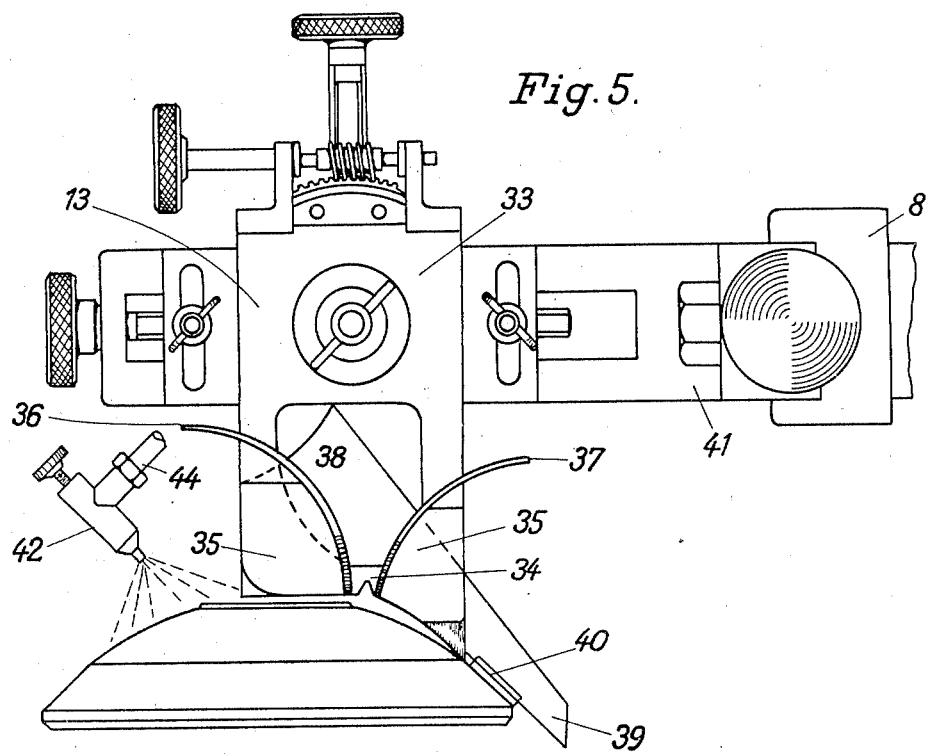
Figure 5A:
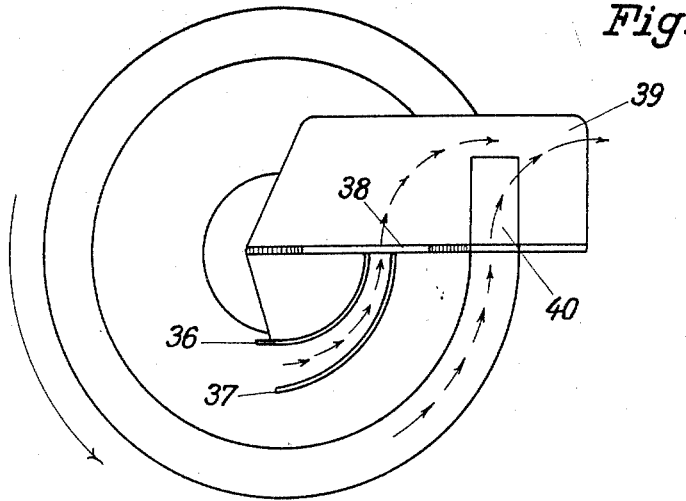

The moulding template according to Figure 5 is constituted by a vertical iron plate 33 (Figure 5) the lower edge of which is provided with a recess 34 for forming the bead shaped bottom edge of the dinner plate, etc., to be moulded. At both sides of this recess 34 are mounted two scrapers 35, 35, the inner front edges of which form knives 36 and 37. The knives 36 and 37 are bent in plan to the shape of a curve and extend in the forward direction along the bottom edge of the dinner plate, etc., to be formed. The upper edges of both knives are bent laterally. The bottom template 33 has, between the two knives 36, 37 an opening 38 next to which is mounted a discharge plate 39. At the end of the discharge plate 39 is provided a cutting-off knife 40 which cuts off the excess of mass at the edge of the article.

Owing to this arrangement, the excess of the mass required for the forming of the bottom edge, which accumulates between the knives 36, 37, is pushed out in a positive manner, practically without resistance, through the opening 38 along the guide plate 39, so that the work proceeds automatically and easily. On the template holder 41 is further laterally mounted a spraying nozzle 42 which is supplied with water by the forcing pump 43 through a pipe 44 and supplies the necessary water to the article to be moulded.

Figure 6:
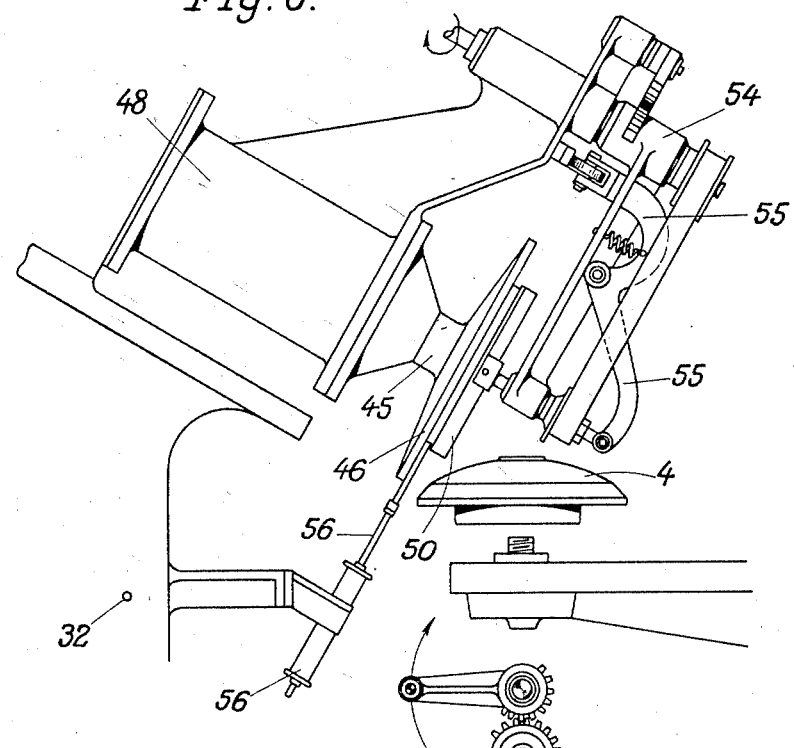
Figure 6A:
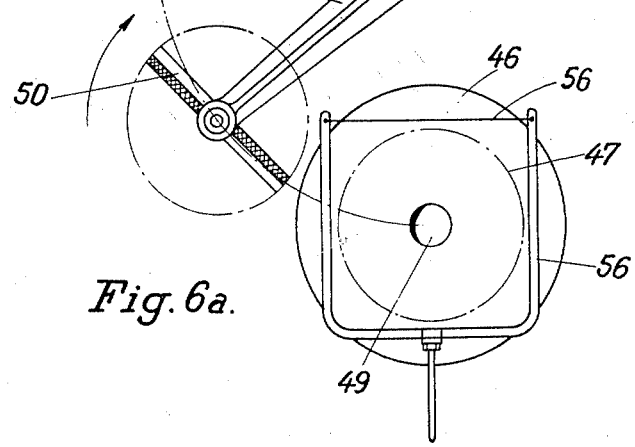

The mass sheet device shown in Figure 1 and on an enlarged scale in Figure 6, is constituted by a press 32 which is arranged laterally of the working table 1 and mounted in a vertically and laterally adjustable manner.

At the front side, above the working moulds 4, the press 32 carries a conical plastic substance discharging nozzle 45 which is formed at the end into a trough-shaped disc 46 which is so arranged, at an angle to the working moulds, that the substance is produced, in sheets 47 during the working. The sheets are intermittently cut-off by a cutting-off tool 56 combined with an air pump, and can automatically drop onto the working moulds 4.

The press 32 comprises a horizontal or vertical tubular body 48 which is provided at the lower conical end with a circular disc 46 preferably of brass. The centre of the disc 46 is provided with a small discharge opening 49 in order to enable the mass forced out, to press against the tool 50. In the interior of the tubular body is mounted a worm which forces forward, through the opening 49 of the disc 46, the substance supplied to a hopper 58 (Figure 1) by conveyor bands 57. Above the tubular body 48 is provided a coupling gear 51 (Figure 1) which intermittently operates the press 32. The coupling gear 51 is intermittently put into operation by the rotatable working table 1 by means of a cam shaft 52 (Figure 1) and connecting rod 53 at the moment at which the working mould 4 is in the central position under the disc 46. In front of the disc 46, is mounted a rocking lever arm 54, the lower end of which reaches to the centre of the disc 46 and occupies a central position in front of the discharge opening 49; this lever arm is operated by the coupling gear 51 and is also thereby intermittently moved to and fro. At the bottom end of the lever arm 54 is provided a constantly rotating tool 50 which uniformly spreads the mass escaping from the discharge opening 49 of the disc 46 along the surface of the disc 46 to form a disc-shaped mass. On the lever arm 54 is further mounted a double armed pressure lever 55 which, during the lateral swinging away of the lever 54, lifts off the rotatable tool 50 from the mass but presses it again against it during the downward oscillation of the arm 54.

Figure 3:
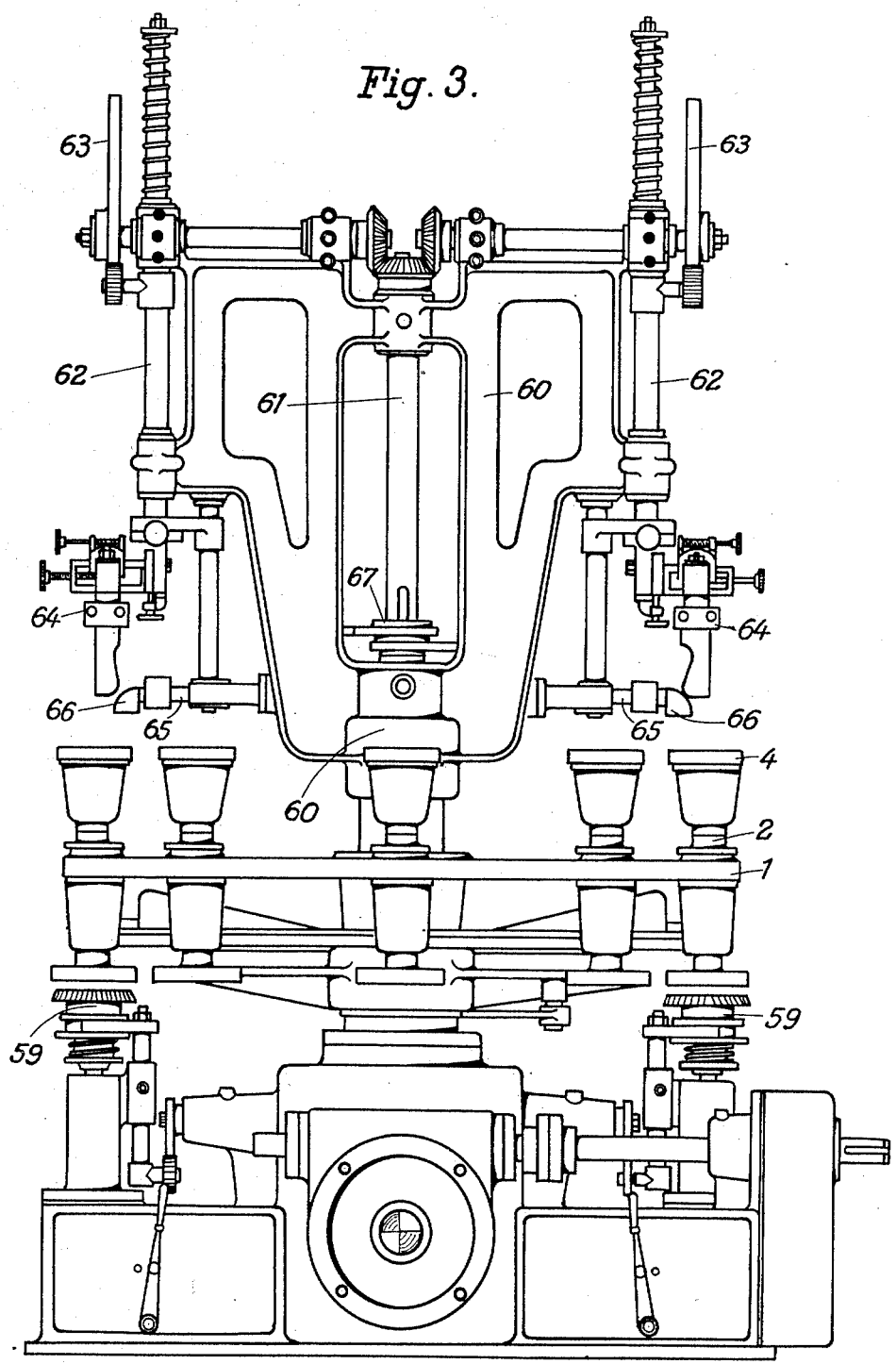
Figure 7:
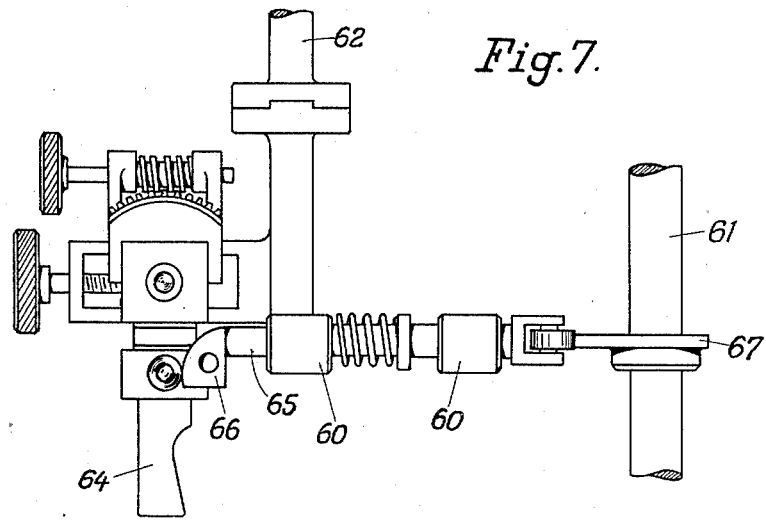
Figure 7A:
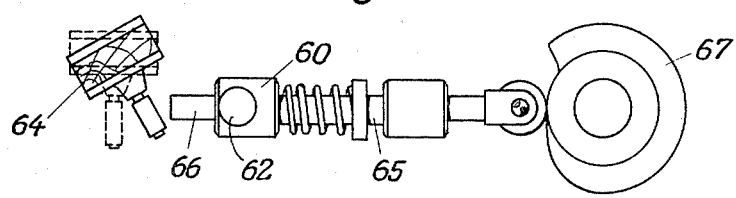

For producing "bead-shaped" deep hollow ware such as salad bowls, cups, etc., the automatic machine could also be provided with vertical tool holding rods as indicated by a construction in Figure 3 of the drawings which shows it in one view, with details shown on an enlarged scale in Figure 7.

Above the rotatable working table 1 which is provided with several rotatable spindles 2 which are operated at periodic time intervals by coupling gears 59, is mounted an iron bracket 60 box-shaped in the centre, in the centre of which is mounted a vertical main driving spindle 61. At each side of the bracket 60 is arranged a vertically adjustable tool holder rod 62, 62, these rods being both operated from the main driving spindle 61 by means of cam discs 63, 63 mounted at the sides. At the bottom ends of the holder rods 62, 62 are arranged adjustable template tools 64, 64. During the downward movement of the holder rods 62, 62, that is to say during the turning operation, the template tool 64, 64 is positively pressed against the inner wall of the rotating working mould by a horizontally adjustable control rod 65, 65 which is provided at the front surface with a curve segment 66, 66. The horizontal adjustable control rods 65, 65 are operated from the main driving shaft 61 by means of small cam discs 67, 67.

When the turned article is finished, the curve segments 66, 66, spring laterally away from the template tool 64, 64, so that at this moment the template tool 64, 64 comes away eccentrically from the inner wall of the article and is raised upwards by the holder rod 62, 62.

By this arrangement, it is possible to produce, on the automatic machine, prominently beaded hollow articles, the output being extremely great and rapid.

Figure 10:
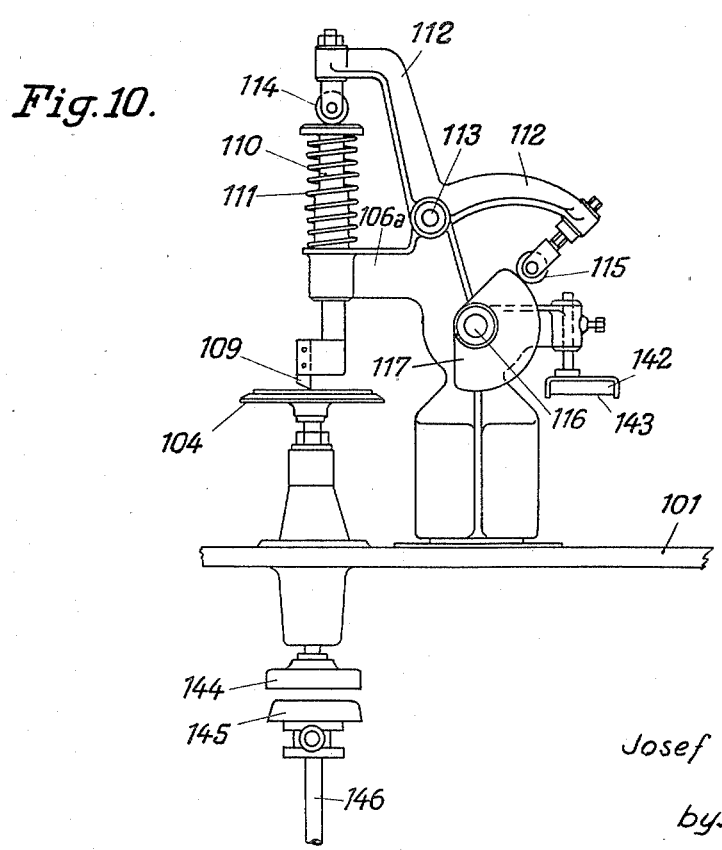
Figure 8:
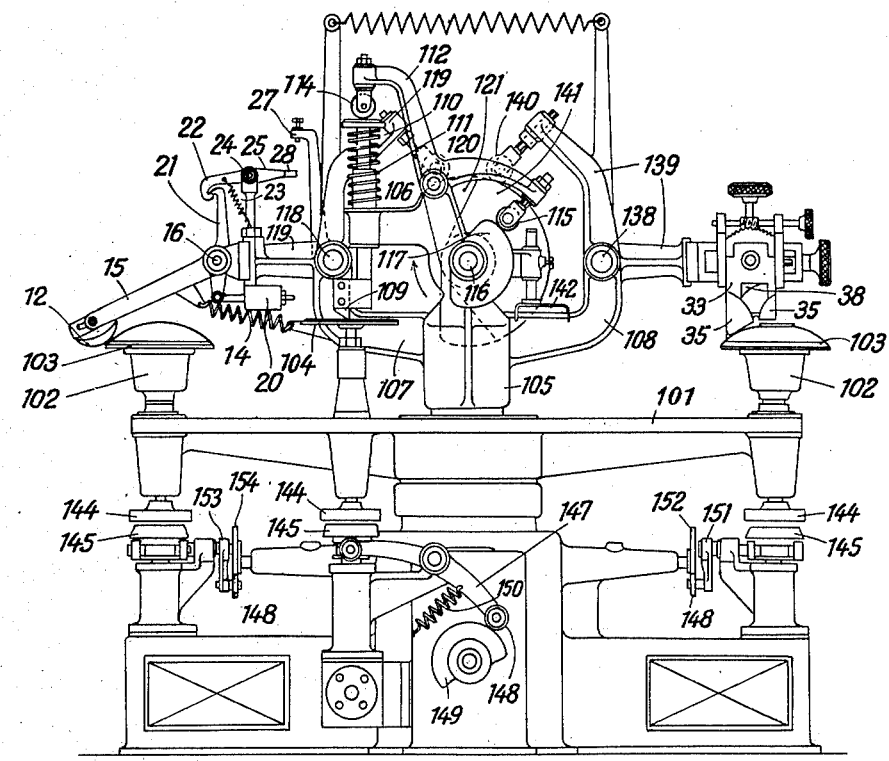
Figure 9:
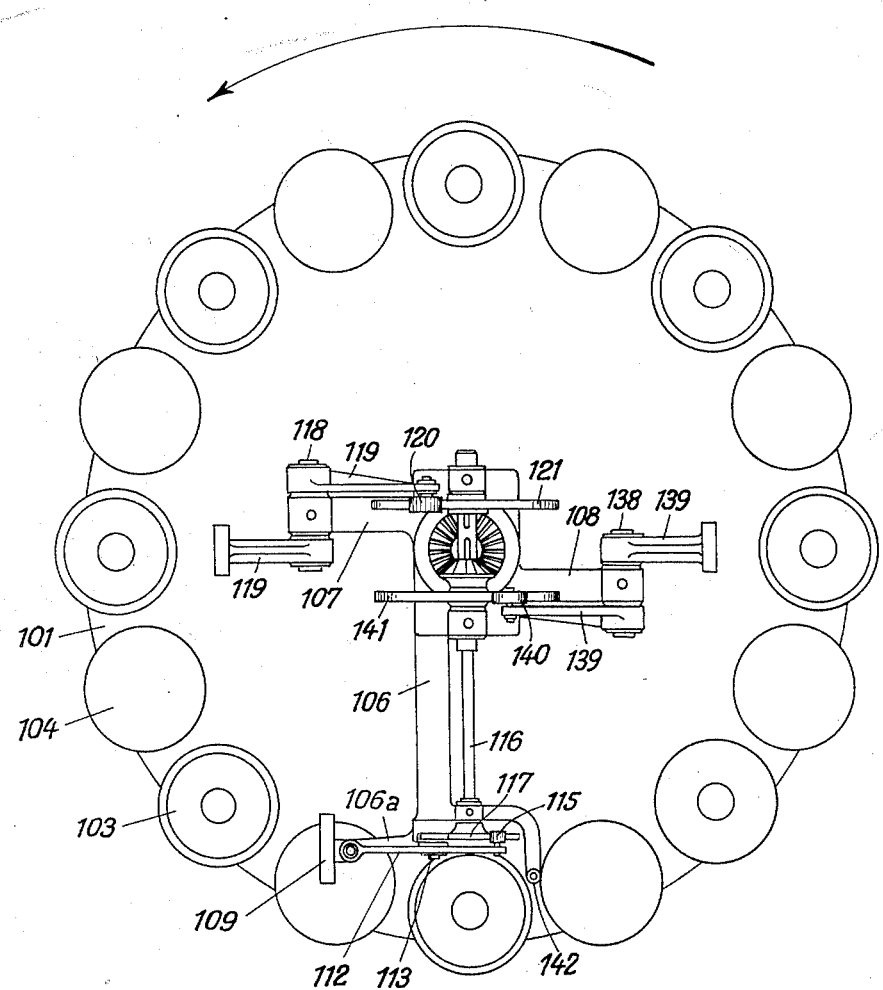

Another example of the machine according to the present invention is shown in Figs. 8 to 10, where Fig. 8 represents an elevation, Fig. 9 a horizontal projection, and Fig. 10 a detail in elevation.

The machine according to this example comprises likewise a rotatable working table 101 which is intermittently operated in a suitable manner, and is provided alternately at equal intervals with rotatable spindles 102 carrying at the top working mould 103 and with likewise rotatable flat discs 104. In the midst of the table 101 is mounted a main iron standard 105 provided with three radial arms 106, 107 and 108.

The mass sheet device is carried by the arm 106, the latter being T-shaped in horizontal projection, and consists of a template tool 109 mounted on a holder rod 110 which can slide vertically in the shoulder 106$^a$ of the arm 106 and is held by the spring 111 in contact with the roller 114 mounted on one end of a double armed lever 112. The latter is rockable about a pin 113 on the arm 106, and its other arm is in contact by means of the roller 115 with the cam disc 117 which is fixed to the constantly rotating shaft 116. On the other end of the shoulder 106$^a$ is mounted a vertically adjustable forked frame 142 comprising a wire cutter 143.

On the arm 107 is mounted a double armed lever 119 rockable about a pin 118 and carrying on its inner end a roller 120 by means of which it is constantly in contact with the cam disc 121 fixed to the rotating shaft 117. A wiping off device of the type described above and illustrated in Figs. 2 and 4 is mounted at the outer end of the lever 119. On the third arm 108 of the central standard 105 is mounted a double armed lever 139 rockable about a pin 138, the inner end of which is by means of a roller 140 in contact with the cam disc 141 fixed to the rotating shaft 116. A moulding device of the type described above and illustrated in Fig. 2 and Fig. 5 is mounted at the outer end of the lever 139.

Both systems of spindles 102 and 104 have at their lower end each one half 144 of a conical friction clutch the other half 145 of which is mounted at the upper end of a spindle 146 vertically adjustable in the ground frame-work of the machine. There are in all three such spindles 146, one in each of the vertical planes of movement of the levers 119 and 139, and the third one underneath the template tool 109. These spindles 146 are operated upon by the double armed levers 147, 151, 153 which are rockably mounted on the frame-work of the machine and carry on their inner end each a roller 148 by means of which they are in contact each with one of the constantly rotating cam discs 149, 152, 154, in such a manner that the clutches 144, 145 are connected every time the table 101 comes to a stand-still between two intermittent movements, and disconnected as soon as the table 101 begins moving.

The arms 106, 107 and 108 are so disposed that whenever the table 101 stands still between two intermittent movements during which it is every time turned through an angle corresponding to the mutual distance of the axes of the spindles 102—102 or 104—104, two of the spindles 102 stand each in one of the vertical planes of movement of the levers 119 and 139, whilst one of the spindles 104 stands underneath the template tool 109.

It is clear that during every period of stand-still of the table 101 three operations, representing each one of three consecutive stages of the manufacture, are performed simultaneously at three different points of one and the same table. Whilst the template tool 109 forms the plastic substance lying on top of the rotating flat disc 104 into a flat sheet, a second sheet of plastic material placed on one of the working moulds 103 is being pressed and smoothed by the wiper-off member 12, and another previously pressed and smoothed sheet is being formed by the moulding template 33. The consecutive operations which each portion of the plastic material has to undergo till it receives its final shape, are the following:

At one point of the circumference of the table 101 a portion of the plastic material is placed by hand or by a suitable mechanical device on top of each flat disc 104, as these pass by. This portion is shaped into a flat sheet by the template tool 109, cut off the surface of the flat disc 104 by the stationary wire-cutter 143 at the moment when the flat disc 104 is passing underneath the latter, removed by hand or by means of a suitable mechanical device from the surface of the flat disc 104 and placed on the top of the next empty working mould 103, pressed and smoothed out by the wiper-off member 12, and finally formed by the moulding template 33, whereupon it is removed by hand or by means of a suitable mechanical device together with its working mould 103 from its spindle 102 and replaced by a fresh empty working mould 103. It is obvious that at each intermittent movement of the table 101 one finished article can be removed, whilst each fresh portion of the plastic material remains on the working table 101 over several intermittent movements of the latter.

What I claim and desire to secure by Letters Patent of the United States is:—

1. A machine for making ceramic ware comprising a revoluble table, means for intermittently revolving the table, moulds carried by the table, means for axially revolving the moulds, a standard situated adjacent the table, a bracket connecting the standard with the table, levers rockably supported by the bracket, means for rocking the levers, a device for wiping plastic substance at the end of one of said levers, a shaping template at the end of the other of said levers, a spraying device adjacent the template, a pneumatic shock-absorbing and movement regulating device co-operating with the wiper carrying lever, a two armed rockable pawl co-operating with the wiper carrying lever, a stationary trip-pin also co-operating with the pawl, an edge trimming cutter co-operating with the wiper carrying lever and moulds, a water-supply pump, a plastic substance supplying press, means situated about the orifice of said press for forming the plastic substance into sheet formation, means for smoothing the sheet of plastic substance and means for cutting off said sheets, and mechanism, operated by the mould supporting table, for intermittently operating said rotary sheet forming tool.

2. A machine for making ceramic ware comprising a revoluble table, means for intermittently revolving the table, moulds carried by the table, on vertically disposed spindles friction-discs for rotating the spindles at intervals, a standard situated adjacent the table, a bracket connecting the standard with the table, levers rockably supported by the bracket, means for rocking the levers, a device for wiping plastic substance at the end of one of said levers, a shaping template at the end of the other of said levers, a spraying device adjacent the template, a pneumatic shock-absorbing and movement regulating device co-operating with the wiper carrying lever, a two armed rockable pawl co-operating with the wiper carrying lever, a stationary trip-pin also co-operating with the pawl, an edge trimming cutter co-operating with the wiper carrying lever and moulds, a water-supply pump, a plastic substance supplying press, means situated about the orifice of said press for forming the plastic substance into sheet formation, means for smoothing the sheet of plastic substance and means for cutting off said sheets, and mechanism, operated by the mould supporting table, for intermittently operating said rotary sheet forming tool.

3. A machine for making ceramic ware comprising a revoluble table, means for intermittently revolving the table, moulds carried by the table, means for axially revolving the moulds, a standard situated adjacent the table, a bracket connecting the standard with the table, levers rockably supported by the bracket, eccentrics for rocking said levers about a single hinge-pin.

4. A machine for making ceramic ware comprising a revoluble table, means for intermittently revolving the table, moulds carried by the table, means for axially revolving the moulds, a standard situated adjacent the table, a bracket connecting the standard with the table, levers rockably supported by the bracket, means for rocking the levers, a wiping device comprising a two-part sponge holder provided with teeth for retaining a sponge between each part, a shaping template consisting of a scraper having curved sharp edges and front edges which are provided with projecting curved knives, said template having an opening between said two knives and a discharge plate and a cutting off knife, a force-pump and water-spraying nozzle, a pneumatic shock-aborbing and movement regulating device co-operating with the wiper carrying lever, a two armed rockable pawl co-operating with the wiper carrying lever, a stationary trip-pin also co-operating with the pawl, an edge-trimming cutter co-operating with the wiper carrying lever and moulds, a water-supply pump, a plastic substance supplying press, means situated about the orifice of said press for forming the plastic substance into sheet formation, means for smoothing the sheet of plastic substance and means for cutting off said sheets, and mechanism, operated by the mould supporting table, for intermittently operating said rotary sheet forming tool.

5. A machine for making ceramic ware comprising a revoluble table, means for intermittently revolving the table, moulds carried by the table, means for axially revolving the moulds, a standard situated adjacent the table, a bracket connecting the standard with the table, levers rockably supported by the bracket, means for rocking the levers, a device for wiping plastic substance at the end of one of said levers, a shaping template at the end of the other of said levers, a spraying device adjacent the template, a pneumatic shock-absorbing and movement regulating device co-operating with the wiper carrying lever, a two armed rockable pawl co-operating with the wiper carrying lever, a stationary trip-pin also co-operating with the pawl, an edge trimming cutter co-operating with the wiper carrying lever and moulds, a water-supply pump, a plastic substance supplying press, adjustable towards and away from the moulds and having a central discharge opening, a disc-shaped flange surrounding said opening, a lever arm, carrying a rotating smoothing and plastic sheet forming tool, toothed gearing for operating the arm and tool, cams geared to the mould supporting table for operating said gearing intermittently, and a wire cutter for severing the sheet from the sheet forming flange on the press.

6. A machine for making ceramic ware comprising a revoluble table, frictional gear for intermittently revolving said table, moulds carried by said table, friction gear for axially revolving said moulds, a standard surmounting said table, shafts resiliently and vertically slidable in said standard, cams for depressing said shafts adjustable templates carried adjustably on said shafts, rods projecting adjustably from the standard and having cam-shaped ends for pushing the template against the substance being moulded and for withdrawing the template away from the inner surface of the finished article as the template rises.

7. A machine for making ceramic ware, comprising a revoluble table, means for intermittently revolving said table, moulds revolubly journaled in said table, flat discs alternating with said moulds and likewise revolubly journaled in said table, means for axially revolving said moulds and flat discs, a standard situated in the center of said table and provided with three radial arms, a template tool for shaping the plastic material into flat sheets guided vertically in one of said radial arms, means for imparting a reciprocal sliding movement to said template tool, a stationary wire-cutter mounted on said radial arm, a two armed lever rockably mounted on the second of said radial arms, a device for wiping plastic substance rockably mounted at the outer end of said two armed lever, a two armed rockable pawl co-operating with the wiper carrying lever, a stationary trip-pin also co-operating with the wiper carrying lever, a two armed lever rockably mounted at the end of the third of said radial arms, a shaping template adjustably mounted at the outer end of said two armed lever, a horizontal shaft journaled in said standard, means for revolving said shafts, and three cam-discs mounted on said shaft, one cam disc co-operating with said template tool for shaping plastic material into flat sheets, and the two other cam discs co-operating each with one of said two armed levers which are rockably mounted on the second and third of said radial arms.

8. A machine for making ceramic ware, comprising a revoluble table, means for intermittently revolving said table, and carrying at their lower ends each one half of a friction clutch, moulds revolubly journaled in said table, flat discs alternating with said moulds, likewise revolubly journaled in said table, and likewise carrying at their lower ends each one half of a friction clutch, a standard situated in the center of said table and provided with three radial arms, three spindles guided vertically in the framework of the machine, approximately each under one of said radial arms and carrying at their upper ends each the second half of a friction clutch, means for revolving said spindles, means for imparting an intermittent reciprocal sliding vertical movement to said spindles, a template tool for shaping the plastic material into flat sheets guided vertically in one of said radial arms, means for imparting a reciprocal sliding movement to said template tool, a stationary wire-cutter mounted on said radial arm, a two armed lever rockably mounted on the second of said radial arms, a device for wiping plastic substance rockably mounted at the outer end of said two armed lever, a two armed rockable pawl co-operating with the wiper carrying lever, a stationary trip-pin also co-operating with the wiper carrying arm, a two armed lever rockably mounted at the end of the third of said radial arms, a shaping template adjustably mounted at the outer end of said two armed lever, a horizontal shaft journaled in said standard, means for revolving said shafts, and three cam-discs mounted on said shaft, one cam-disc co-operating with said template tool for shaping plastic material into flat sheets, and the other two cam discs co-operating each with one of said two armed levers which are rockably mounted on the second and third of said radial arms.

In testimony whereof I have signed my name to this specification.

JOSEF DENGLER.